United States Patent Office 2,934,527
Patented Apr. 26, 1960

2,934,527

SOLID COPOLYMER OF PROPYLENE AND BICYCLO-(2,2,1)-2-HEPTENE

George Robert McKay and Paul Herman Settlage, Wilmington, Del., assignors to E. I. du Pont de Nemours and Company, Wilmington, Del., a corporation of Delaware No Drawing. Application March 10, 1958
Serial No. 720,052

3 Claims. (Cl. 260—88.2)

The present invention relates to novel hydrocarbon polymers, and more particularly to copolymers of propylene and bicyclo(2.2.1)heptene-2.

In accordance with the present invention novel copolymers of propylene and bicyclo(2.2.1)heptene-2 are obtained when a mixture of these monomers is contacted with an organo-metallic catalyst containing titanium at a valence state below three. The catalysts are obtained by the reaction of a titanium halide with an organometallic compound containing the structure M—R, where M is a metal from groups I, II and III of the periodic table of elements and R is a hydrocarbon radical. The process of the present invention is preferably carried out in the presence of an inert hydrocarbon solvent as the reaction medium. Reaction temperatures are generally maintained above room temperature and preferably are within a range of 100° to 250° C. The reaction pressure is not critical and any pressure as will maintain sufficient propylene for polymerization purposes is applicable. The preferred titanium catalyst components are titanium chlorides although titanium bromides, fluorides and iodides may also be employed. The preferred organometallic compounds employed in the formation of the catalyst are metal alkyls and metal aryls such as aluminum trialkyls, tin tetraalkyls, lithium aluminum tetraalkyls, sodium alkyls, and magnesium diaryls. The size of the alkyl group is not critical to the formation of the catalyst. The catalyst components are generally employed in a molar ratio of 0.5 to 10 of the organometallic to the titanium halide, although it is basically only necessary to employ sufficient of the organometallic to reduce the titanium to, at least in part, a valence state below three. The quantity of the catalyst may vary from 0.01% to 10% by weight of the monomers employed.

The propylene-bicycloheptene copolymers of the present invention may vary in their composition from low propylene content copolymers to low bicycloheptene copolymers. The composition of the copolymer is, in general, controlled by the composition of the monomers in the reaction mixture. The copolymers of the present invention are characterized by good melt flow properties which allow their ready fabrication by melt extrusion techniques and injection molding techniques into films, fibers and other shaped articles. The rigidity of the copolymer varies with the composition. Thus, at high bicycloheptene contents exceedingly stiff polymers are obtained, whereas at low bicycloheptene contents soft and elastic compositions are obtained. Particularly outstanding copolymers are obtained at low bicycloheptene contents of 1 to 10%. These polymers have exceedingly good toughness properties as compared to homopolymers of propylene, particularly at low temperatures, and greatly enhance the value of polypropylene resins. In comparison to the higher bicycloheptene content copolymers, the copolymers containing from 1 to 10% of bicycloheptene show X-ray crystallinity, thus permitting improvement of mechanical properties through orientation.

The present invention is further illustrated by the following examples.

*Example I*

Into a 320 ml. stainless steel autoclave was charged under nitrogen 47 ml. of benzene, 21 ml. of cyclohexane, 47 g. of bicyclo(2.2.1)heptene-2, 0.024 mole of aluminum triisobutyl and 0.05 mole of titanium tetrachloride. The nitrogen was replaced with 50 g. of propylene and the resulting reaction mixture was agitated at 150° to 160° C. for a period of 2 hours. The reaction mixture was treated with an excess of methanol, deactivating and solubilizing catalyst residues. The copolymer was collected by filtration, washed with hot methanol and acetone, and on drying weighed 48 g. Elemental carbon analysis of the copolymer showed it to contain 10% of bicyclo(2.2.1)heptene-2. The copolymer could be compression molded into flexible transparent films by heating the polymer to 200° C. for a short time. The copolymer showed considerable melt flow at temperatures of 190° C. The copolymer was found to have a density of 0.90 and an X-ray crystallinity of 35% but was considerably different in "feel" as compared to a polypropylene of similar crystallinity.

*Example II*

Employing the procedure of Example I, 10 g. of propylene was copolymerized with 75 g. of bicyclo(2.2.1)-heptene-2. On work-up there was obtained 1.4 g. of a copolymer of bicyclo(2.2.1)heptene-2 and propylene having a density of 0.99. Infrared analysis indicated the presence of absorption that was not due to either homopolymer. The high density of the polymer suggested the material contained a large concentration of norbornene, while the infrared scan exhibited C-methyl absorption indicative of a propylene content perhaps as great as 10%. The copolymer could be compression molded at 190° C. into stiff films and showed considerable melt flow at that temperature. X-ray analysis showed the copolymer to be amorphous.

We claim:

1. A normally solid copolymer consisting essentially of propylene and bicyclo(2.2.1)heptene-2.

2. A normally solid copolymer consisting essentially of propylene and bicyclo(2.2.1)heptene-2, said copolymer containing from 1 to 10 weight percent of bicyclo(2.2.1)-heptene-2.

3. The copolymer of claim 1 in film form.

References Cited in the file of this patent

UNITED STATES PATENTS

| | | |
|---|---|---|
| 2,721,189 | Anderson et al. | Oct. 18, 1955 |
| 2,799,668 | Anderson et al. | July 16, 1957 |
| 2,824,089 | Peters et al. | Feb. 18, 1958 |